US007241831B2

(12) United States Patent
Waddell et al.

(10) Patent No.: US 7,241,831 B2
(45) Date of Patent: Jul. 10, 2007

(54) ELASTOMERIC COMPOSITIONS

(75) Inventors: Walter Harvey Waddell, Pasadena, TX (US); David Yen-Lung Chung, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 375 days.

(21) Appl. No.: 10/494,994

(22) PCT Filed: Dec. 9, 2002

(86) PCT No.: PCT/US02/39363

§ 371 (c)(1),
(2), (4) Date: May 10, 2004

(87) PCT Pub. No.: WO03/054032

PCT Pub. Date: Jul. 3, 2003

(65) Prior Publication Data

US 2004/0242795 A1 Dec. 2, 2004

Related U.S. Application Data

(60) Provisional application No. 60/381,326, filed on May 17, 2002, provisional application No. 60/339,966, filed on Dec. 10, 2001.

(51) Int. Cl.
 *C08L 27/00* (2006.01)
(52) U.S. Cl. .................. 524/519; 524/526; 524/572; 525/332.3; 525/332.6; 525/332.9; 525/343
(58) Field of Classification Search ............ 525/332.3, 525/332.6, 332.9, 343; 524/519, 526, 572
See application file for complete search history.

(56) References Cited

U.S. PATENT DOCUMENTS

| | | | |
|---|---|---|---|
| 2,804,448 A | 8/1957 | Hallenbeck | 260/85.3 |
| 3,042,662 A | 7/1962 | Cottle et al. | 260/85.3 |
| 3,560,458 A | 2/1971 | Kennedy et al. | 260/85.3 |
| 3,948,868 A | 4/1976 | Powers | 260/80.7 |
| 4,039,506 A | 8/1977 | Gessler et al. | 260/42.35 |
| 4,779,657 A | 10/1988 | Cheung et al. | 152/510 |
| 4,908,421 A | 3/1990 | Mishra et al. | 526/147 |
| 5,077,345 A | 12/1991 | Newman et al. | 525/355 |
| 5,539,065 A | 7/1996 | Baade et al. | 526/74 |
| 5,543,479 A | 8/1996 | Baade et al. | 526/88 |
| 5,556,907 A | 9/1996 | Fuchs et al. | 524/493 |
| 5,621,044 A | 4/1997 | Wang | 525/193 |
| 5,703,182 A | 12/1997 | Langstein et al. | 526/185 |
| 5,886,106 A | 3/1999 | Sumner et al. | 515/332.8 |
| 5,979,529 A | 11/1999 | Nakane et al. | |
| 2001/0009948 A1 | 7/2001 | Hopkins et al. | 525/330.7 |

FOREIGN PATENT DOCUMENTS

| | | |
|---|---|---|
| CA | 2293149 | 6/2001 |
| EP | 1 111 004 | 6/2001 |
| EP | 1 215 241 | 6/2002 |
| FR | 1 132 894 | 3/1957 |
| WO | WO 01/21672 | 3/2001 |

OTHER PUBLICATIONS

Abstract for ACS Rubber Division Meeting—Fall 2000, Bayer Inc., Entitled Synthesis, Bromination and Cure of Isobutylene/Isoprene/p-Methylstyrene and Isobutylene/Isoprene/Styrene Terpolymers, Cincinnati, OH., Oct. 17-19, 2000, paper 104.
WO 03/050171 entitled "Elastomeric Compositions", (entering U.S. National Stage on May 10, 2004). (2001B122).
WO 03/050149 entitled "Halogenated Isoolefin Based Terpolymers", (entering U.S. National Stage on May 10, 2004). (2001B122B).

*Primary Examiner*—Bernard Lipman
(74) *Attorney, Agent, or Firm*—Leandro Arechederra, II; Xianbing Feng

(57) ABSTRACT

The present invention includes compositions suitable for air barriers such as innerliners where adhesion to tire carcass materials (e.g., SBR) and flexibility are desirable, as well as low air permeability. The invention includes a tire innerliner made by combining a filler; a sulfur cure system; optionally at least one secondary rubber; and at least one halogenated terpolymer of $C_4$ to $C_8$ isoolefin derived units, $C_4$ to $C_{14}$ multiolefin derived units, and p-alkylstyrene derived units. Examples of suitable fillers include modified carbon black, carbon black, silica, exfoliated clays, and combinations thereof. The present invention also includes a method of producing an elastomeric terpolymer composition comprising combining in a diluent $C_4$ to $C_8$ isoolefin monomers, $C_4$ to $C_{14}$ multiolefin monomers, and p-alkylstyrene monomers in the presence of a Lewis acid and at least one initiator to produce the terpolymer. Examples of suitable initiators include cumyl compounds and or halogenated organic compounds, especially secondary or tertiary halogenated compounds such as, for example, t-butylchloride, 2-acetyl-2-phenylpropane (cumyl acetate), 2-methoxy-2-phenyl propane (cumylmethyl-ether), 1,4-di(2-methoxy-2-propyl) benzene (di(cumylmethyl ether)); the cumyl halides, particularly the chlorides, such as, for example 2-chloro-2-phenylpropane, cumyl chloride (1-chloro-1-methylethyl) benzene), 1,4-di(2-chloro-2-propyl)benzene (di(cumylchloride)), and 1,3,5-tri(2-chloro-2-propyl)benzene (tri(cumylchloride)); the aliphatic halides, particularly the chlorides, such as, for example, 2-chloro-2,4,4-trimethylpentane (TMPCl), and 2-bromo-2,4,4-trimethylpentane (TMPBr).

94 Claims, 1 Drawing Sheet

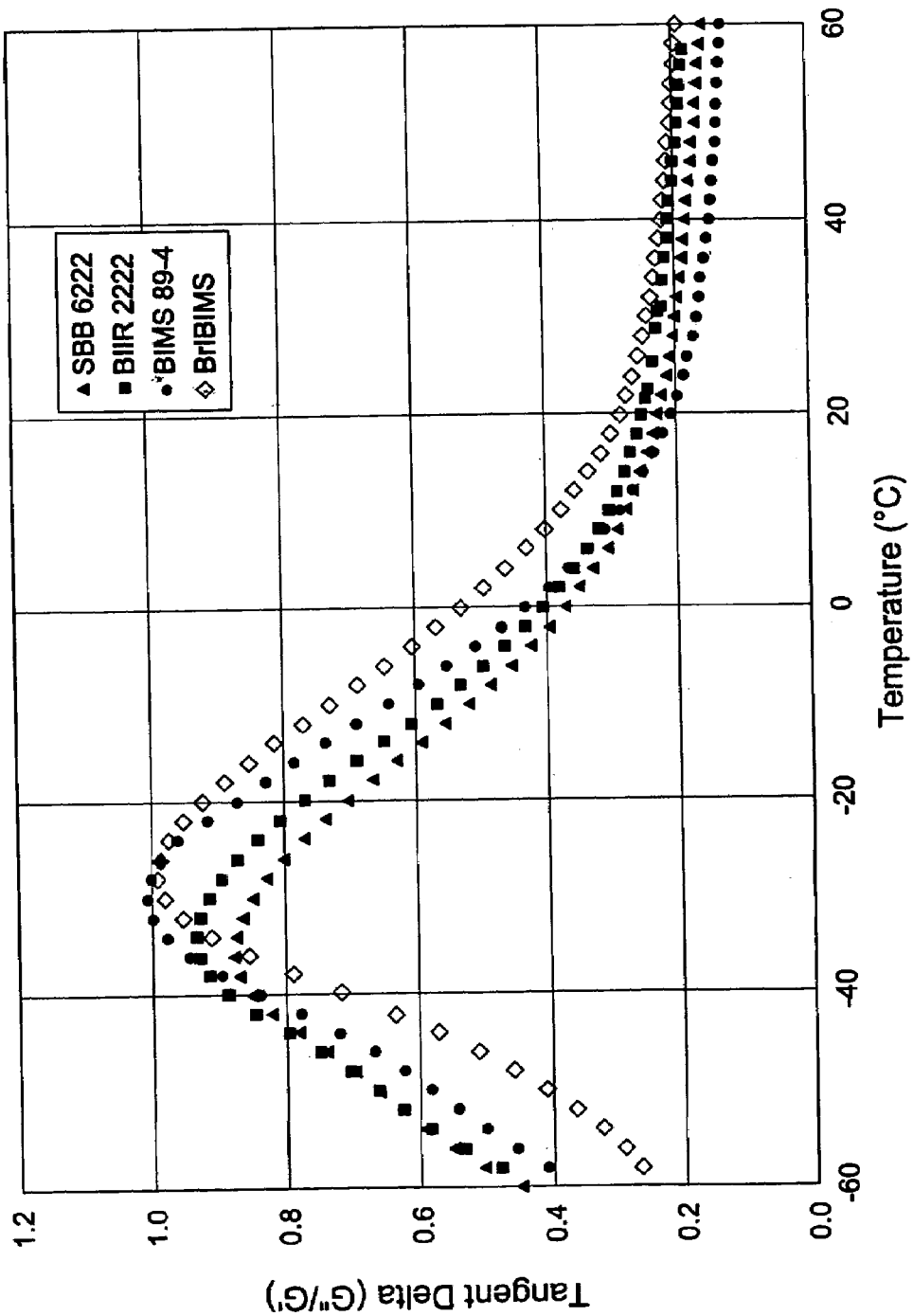
Fig. 1 Elastomer Blends for Air Barrier Applications

ELASTOMERIC COMPOSITIONS

CROSS REFERENCE TO RELATED APPLICATIONS

This application is a National Stage Application of International Application No. PCT/US02/39363, filed Dec. 9, 2002, which claims the benefit of Provisional Application Nos. 60/339,966, filed Dec. 10, 2001 and 60/381,326, filed May 17, 2002.

FIELD OF INVENTION.

The present invention relates to compositions of isobutylene-based terpolymers. More particularly, the invention relates to terpolymer compositions, wherein the terpolymer includes isoolefin derived units, styrenic derived units, and multiolefin derived units, the compositions being useful in tires, particularly in automotive components such as treads, belts, tire innerliners, innertubes, and other air barriers.

BACKGROUND OF THE INVENTION

Isobutylene-based terpolymers including isoolefin, styrenic, and multiolefin derived units have been disclosed in U.S. Pat. Nos. 3,948,868, 4,779,657; and WO 01/21672. Compositions useful for air barriers such as innerliners and innertubes which include such terpolymers are not known.

Improving the specific properties of tire innerliners without sacrificing current performance is desirable. Use of isobutylene-based elastomers such as butyl rubber (IIR), halobutyl rubbers (chloro (CIIR) or bromo (BIIR)) or brominated isobutylene-co-p-methylstyrene (BIMS) as the innerliner polymer serves to provide for decreased permeability to air compared to general purpose elastomers (such as NR, BR, or SBR) or their blends with isobutylene elastomers. Flex fatigue resistance, adhesion to other tire components such as carcass and bead compounds, and abrasion resistance are also desirable performance properties. Use of BIMS copolymers increases the compatibility of the innerliner with GPR hydrocarbon elastomers; however, co-vulcanization using sulfur cure systems is still not achieved to a sufficiently high degree. Improved lab adhesion values to carcass compounds is still desirable.

To be useful in, for example, a tire tread or tire sidewall as part of a multi-component automobile tire, the terpolymer must desirably be both sulfur curable, and compatible with other rubbers such as natural rubber and polybutadiene. Further, in order to serve as an air barrier such as a tire innerliner, the terpolymer compositions must be air impermeable, adhere well to the tire carcass such as a poly(styrene-co-butadiene) (SBR) carcass, and have suitable durability. These properties are often difficult to achieve together, as improving one can often diminish the other.

It is unexpected that the incorporation of a multiolefin derived unit in a composition including a polymer having a isobutylene/p-methylstyrene backbone would contribute to both improved carcass adhesion and flexibility, while maintaining air impermeability. Likewise, it is unexpected that such terpolymer will sulfur cure in light of the IB/PMS copolymers failing to sulfur vulcanize. Yet, the inventors here demonstrate, among other things, the practical use of certain isoolefinic terpolymers that incorporate multiolefins that are sulfur curable. More particularly, it has been discovered that these terpolymers are useful in curable blends with suitable fillers and the like due to improved traction and abrasion performance, thus making these compositions useful in tire treads, sidewalls as well as air barriers such as innerliners and innertubes for pneumatic tires.

Other background references include U.S. Pat. Nos. 3,560,458 and 5,556,907 and EP 1215 241 A.

SUMMARY OF THE INVENTION

These and other problems are solved by a terpolymer prepared by incorporating isobutylene (IB) along with isoprene (I) and para-methylstyrene (MS) derived units. The isoprene is desirably present in sufficient concentration in the terpolymer to promote vulcanization by conventional sulfur curing ingredients. In addition, the terpolymer can be halogenated to further enhance crosslinking reactions. Thus, halogen atoms, desirably chlorine or bromine, can be incorporated onto the isoprene moiety in the backbone of the terpolymer such as in bromobutyl rubber, or onto the backbone and the methyl group of the methylstyrene. These reactive sites can allow for crosslinking of the halogenated terpolymer with itself, and also with hydrocarbon diene rubbers used in tire carcass compounds, such as NR, BR and SBR.

The present invention includes compositions suitable for air barriers such as innerliners or innertubes for automobile tires and other articles where air impermeability and flexibility are desirable. The invention includes an automotive innerliner made from a composition of at least one (i.e., one or more) filler; a sulfur cure system; and optionally at least one secondary rubber; and at least one halogenated terpolymer of $C_4$ to $C_8$ isoolefin derived units, $C_4$ to $C_{14}$ multiolefin derived units, and p-alkylstyrene derived units. In one embodiment, the terpolymer is halogenated. Examples of suitable fillers include but are not limited to carbon black, modified carbon black, silica, so called nanoclays or exfoliated clays, and combinations thereof.

The present invention also includes a method of producing an elastomeric terpolymer composition comprising combining in a diluent having a dielectric constant of at least 6 in one embodiment, and at least 9 in another embodiment: $C_4$ to $C_8$ isoolefin monomers, $C_4$ to $C_{14}$ multiolefin monomers, and p-alkylstyrene monomers in the presence of a Lewis acid and at least one initiator to produce the terpolymer. Examples of suitable initiators include t-butylchloride, 2-acetyl-2-phenylpropane (cumyl acetate), 2-methoxy-2-phenyl propane (cumylmethyl-ether), 1,4-di(2-methoxy-2-propyl)benzene (di(cumylmethyl ether)); the cumyl halides, particularly the chlorides, such as, for example 2-chloro-2-phenylpropane, cumyl chloride (1-chloro-1-methylethyl) benzene), 1,4-di(2-chloro-2-propyl)benzene (di(cumylchloride)), and 1,3,5-tri(2-chloro-2-propyl)benzene (tri(cumylchloride)); the aliphatic halides, particularly the chlorides, such as, for example, 2-chloro-2,4,4-trimethylpentane (TMPCl), 2-bromo-2,4,4-trimethylpentane (TMPBr), and 2,6-dichloro-2,4,4,6-tetramethylheptane; cumyl and aliphatic hydroxyls such as 1,4-di((2-hydroxyl-2-propyl)-benzene), 2,6-dihydroxyl-2,4,4,6-tetramethylheptane, 1-chloroadamantane and 1-chlorobomane, 5-tert-butyl-1,3-di(1-chloro-1-methyl ethyl) benzene and similar compounds or mixtures of such compounds as listed above.

BRIEF DESCRIPTION OF DRAWING

FIG. 1 is a plot of tangent delta (G"/G') values as a function of temperature for example 4 (SBB), 5 (BIIR), 6 (BIMS) and 7 (BrIBIMS), all including in the composition carbon black.

DETAILED DESCRIPTION OF THE INVENTION

The present invention includes a method of making isobutylene-based terpolymers including isobutylene derived units, styrenic derived units, and multiolefin derived units, and compositions of these terpolymers and halogenated terpolymers. The terpolymers of the present invention can be made via carbocationic polymerization processes using a mixture of at least the monomers, a Lewis acid catalyst, an initiator, and a diluent. The polymerization is typically carried out either in slurry such as in a continuous slurry reactor or butyl-type reactor, or in solution. The copolymerization reactor is maintained substantially free of impurities which can complex with the catalyst, the initiator, or the monomers. By substantially free of impurities, it is meant that the impurities are at a level of no greater than 100 ppm. Anhydrous conditions are preferred and reactive impurities, such as components containing active hydrogen atoms (water, alcohol and the like) are desirably removed from both the monomer and diluents by techniques well-known in the art. These impurities, such as water, are present, if at all, to an extent no greater than 500 ppm in one embodiment.

As used herein, the term "catalyst system" refers to and includes any Lewis Acid or other metal complex used to activate the polymerization of olefinic monomers, as well as the initiator described below, and other minor catalyst components described herein.

As used herein, the term "polymerization system" includes at least the catalyst system, diluent, the monomers and reacted monomers (polymer) within the butyl-type reactor. A "butyl-type" reactor refers to any suitable reactor such as a small, laboratory scale, batch reactor or a large plant scale reactor. One embodiment of such a reactor is a continuous flow stirred tank reactor ("CFSTR") is found in U.S. Pat. No. 5,417,930. In these reactors, slurry (reacted monomers) is circulated through tubes of a heat exchanger by a pump, while boiling ethylene on the shell side provides cooling, the slurry temperature being determined by the boiling ethylene temperature, the required heat flux and the overall resistance to heat transfer.

As used herein, the term "diluent" means one or a mixture of two or more substances that are liquid or gas at room temperature and atmospheric pressure that can act as a reaction medium for polymerization reactions.

As used herein, the term "slurry" refers to reacted monomers that have polymerized to a stage that they have precipitated from the diluent. The slurry "concentration" is the weight percent of these reacted monomers—the weight percent of the reacted monomers by total weight of the slurry, diluent, unreacted monomers, and catalyst system.

The term "elastomer" may be used interchangeably with the terms "rubber", as used herein, and is consistent with the definition in ASTM 1566.

As used herein, the new numbering scheme for the Periodic Table Groups are used as in HAWLEY'S CONDENSED CHEMICAL DICTIONARY 852 (13th ed. 1997).

As described herein, polymers and copolymers of monomers are referred to as polymers or copolymers including or comprising the corresponding monomer "derived units". Thus, for example, a copolymer formed by the polymerization of isoprene and isobutylene monomers may be referred to as a copolymer of isoprene derived units and isobutylene derived units.

As used herein the term "butyl rubber" is defined to mean a polymer predominately comprised of repeat units derived from isoolefins such as isobutylene but including repeat units derived from a multiolefin such as isoprene; and the term "terpolymer" is used to describe a polymer including isoolefin derived units, multiolefin derived units, and styrenic derived units.

As used herein, the term "styrenic" refers to any styrene or substituted styrene monomer unit. By substituted, it is meant substitution of at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl.

As used herein, the term "substituted aryl" means phenyl, naphthyl and other aromatic groups, substituted by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. An "aryl" group is any aromatic ring structure such as a phenyl or naphthyl group.

Butyl-type rubber is an isobutylene-based polymer produced by the polymerization reaction between isoolefin and a conjugated diene—or multiolefinic—comonomers, thus containing isoolefin-derived units and multiolefin-derived units. The terpolymers of the present invention are prepared in a manner similar to that for traditional butyl rubbers except that an additional comonomer (e.g., a styrenic monomer) is also incorporated into the polymer chains. The olefin polymerization feeds employed in connection with the catalyst and initiator system (described in more detail below) are those olefinic compounds, the polymerization of which are known to be cationically initiated. Preferably, the olefin polymerization feeds employed in the present invention are those olefinic compounds conventionally used in the preparation of butyl-type rubber polymers. The terpolymers are prepared by reacting a comonomer mixture, the mixture having at least (1) a $C_4$ to $C_8$ isoolefin monomer component such as isobutylene, (2) a styrenic monomer, and (3) a multiolefin monomer component.

The terpolymer of the present invention can be defined by ranges of each monomer derived unit. The isoolefin is in a range from at least 70 wt % by weight of the total terpolymer in one embodiment, and at least 80 wt % in another embodiment, and at least 90 wt % in yet another embodiment, and from 70 wt % to 99.5 wt % in yet another embodiment, and 85 to 99.5 wt % in another embodiment. The styrenic monomer is present from 0.5 wt % to 30 wt % by weight of the total terpolymer in one embodiment, and from 1 wt % to 25 wt % in another embodiment, and from 2 wt % to 20 wt % in yet another embodiment, and from 5 wt % to 20 wt % in yet another embodiment. The multiolefin component in one embodiment is present in the terpolymer from 30 wt % to 0.2 wt % in one embodiment, and from 15 wt % to 0.5 wt % in another embodiment. In yet another embodiment, from 8 wt % to 0.5 wt % of the terpolymer is multiolefin. Desirable embodiments of terpolymer may include any combination of any upper wt % limit combined with any lower wt % limit by weight of the terpolymer.

The isoolefin may be a $C_4$ to $C_8$ compound, in one embodiment selected from isobutylene, isobutene, 2-methyl-1-butene, 3-methyl-1-butene, 2-methyl-2-butene, and 4-methyl-1-pentene. The styrenic monomer may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. The multiolefin may be a $C_4$ to $C_{14}$ diene, conjugated or not, in one embodiment selected from isoprene, butadiene, 2,3-dimethyl-1,3-butadiene, myrcene, 6,6-dimethyl-fulvene, hexadiene, cyclopentadiene, methylcyclopentadiene, and piperylene.

Isomonoolefin, styrene-based monomers, and multiolefin monomers, particularly isobutylene, p-methylstyrene and isoprene, can be copolymerized under cationic conditions. See, for example, WO00/27807 and 01/04731; U.S. Pat. Nos. 3,560,458, and 5,162,445. The copolymerization is carried out by means of at least one Lewis Acid catalyst. Desirable catalysts are Lewis Acids based on metals from Group 4, 13 and 15 of the Periodic Table of the Elements, including boron, aluminum, gallium, indium, titanium, zirconium, tin, vanadium, arsenic, antimony, and bismuth. In one embodiment, the metals are aluminum, boron and titanium, with aluminum being desirable.

The Group 13 Lewis Acids have the general formula $R_nMX_{3-n}$, wherein "M" is a Group 13 metal, R is a monovalent hydrocarbon radical selected from $C_1$ to $C_{12}$ alkyl, aryl, arylalkyl, alkylaryl and cycloalkyl radicals; and n is an integer from 0 to 3; and X is a halogen independently selected from fluorine, chlorine, bromine, and iodine, preferably chlorine. The term "arylalkyl" refers to a radical containing both aliphatic and aromatic structures, the radical being at an alkyl position. The term "alkylaryl" refers to a radical containing both aliphatic and aromatic structures, the radical being at an aryl position. Nonlimiting examples of these Lewis acids include aluminum chloride, aluminum bromide, boron trifluoride, boron trichloride, ethyl aluminum dichloride ($EtAlCl_2$ or EADC), diethyl aluminum chloride ($Et_2AlCl$ or DEAC), ethyl aluminum sesquichloride ($Et_{1.5}AlCl_{1.5}$ or EASC), trimethyl aluminum, and triethyl aluminum.

The Group 4 Lewis Acids have the general formula $MX_4$, wherein M is a Group 4 metal and X is a ligand, preferably a halogen. Nonlimiting examples include titanium tetrachloride, zirconium tetrachloride, or tin tetrachloride.

The Group 15 Lewis Acids have the general formula $MX_y$, wherein M is a Group 15 metal, X is a ligand, preferably a halogen, and y is an integer from 3 to 5. Nonlimiting examples include vanadium tetrachloride and antimony pentafluoride. In one embodiment, Lewis acids may be any of those useful in cationic polymerization of isobutylene copolymers including: $AlCl_3$, EADC, EASC, DEAC, $BF_3$, $TiCl_4$, etc. with EASC and EADC being desirable in one embodiment.

Catalyst efficiency (based on Lewis Acid) in a large-scale continuous slurry reactor is preferably maintained between 10000 lb. of polymer/lb. of catalyst and 300 lb. of polymer/lb. of catalyst and desirably in the range of 4000 lb. of polymer/lb. of catalyst to 1000 lb. of polymer/lb. of catalyst by controlling the molar ratio of Lewis Acid to initiator.

According to one embodiment of the invention, the Lewis Acid catalyst is used in combination with an initiator. The initiator may be described by the formula (A):

(A)

wherein X is a halogen, desirably chlorine or bromine; $R_1$ is selected from hydrogen, $C_1$ to C8 alkyls, and $C_2$ to $C_8$ alkenyls, aryl, and substituted aryl; $R_3$ is selected from $C_1$ to $C_8$ alkyls, $C_2$ to $C_8$ alkenyls, aryls, and substituted aryls; and $R_2$ is selected from $C_4$ to $C_{200}$ alkyls, $C_2$ to $C_8$ alkenyls, aryls, and substituted aryls, $C_3$ to $C_{10}$ cycloalkyls, and groups represented by the following formula (B):

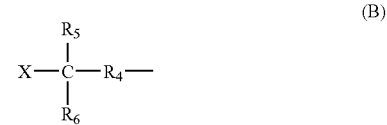

(B)

wherein X is a halogen, desirably chlorine or bromine; $R_5$ is selected from $C_1$ to $C_8$ alkyls, and $C_2$ to $C_8$ alkenyls; $R_6$ is selected from $C_1$ to $C_8$ alkyls, $C_2$ to $C_8$ alkenyls aryls, and substituted aryls; and $R_4$ is selected from phenylene, biphenyl, α,ω-diphenylalkane and —$(CH_2)_n$—, wherein n is an integer from 1 to 10; and wherein $R_1$, $R_2$, and $R_3$ can also form adamantyl or bornyl ring systems, the X group being in a tertiary carbon position in one embodiment.

As used herein, the term "alkenyl" refers to singly or multiply-unsaturated alkyl groups such as, for example, $C_3H_5$ group, $C_4H_5$ group, etc.

Substitution of the above structural formula radical (B) for $R_2$ in formula (A) results in the following formula (C):

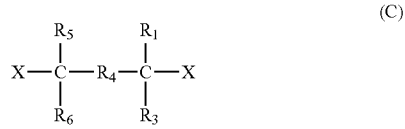

wherein X, $R_1$, $R_3$, $R_4$, $R_5$ and $R_6$ are as defined above. The compounds represented by structural formula (C) contain two dissociable halides.

Multifunctional initiators are employed where the production of branched copolymers is desired, while mono- and di-functional initiators are preferred for the production of substantially linear copolymers.

In one desirable embodiment, the initiator is an oligomer of isobutylene as represented in structure (D):

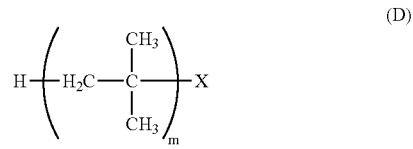

wherein X is a halogen, and the value of m is from 1 to 60, and mixtures thereof. In another embodiment, m is from 2 to 40. This structure is also described as a tertiary alkyl chloride-terminated polyisobutylene having a Mn up to 2500 in one embodiment, and up to 1200 in another embodiment.

Non-limiting examples of suitable initiators are cumyl esters of hydrocarbon acids, and alkyl cumyl ethers, other cumyl compounds and or halogenated organic compounds, especially secondary or tertiary halogenated compounds such as, for example, t-butyl chloride, 2-acetyl-2-phenyl-propane (cumyl acetate), 2-methoxy-2-phenyl propane (cumylmethyl-ether), 1,4-di(2-methoxy-2-propyl)benzene (di(cumylmethyl ether)); the cumyl halides, particularly the chlorides, such as, for example 2-chloro-2-phenylpropane, cumyl chloride (1-chloro-1-methylethyl)benzene), 1,4-di(2-chloro-2-propyl)benzene (di(cumylchloride)), and 1,3,5-tri(2-chloro-2-propyl)benzene (tri(cumylchloride)); the aliphatic halides, particularly the chlorides, such as, for example, 2-chloro-2,4,4-trimethylpentane ("TMPCl"), 2-bromo-2,4,4-trimethylpentane ("TMPBr"), and 2,6-dichloro-2,4,4,6-tetramethylheptane; cumyl and aliphatic hydroxyls such as 1,4-di((2-hydroxyl-2-propyl)-benzene), 2,6-dihydroxyl-2,4,4,6-tetramethyl-heptane, 1-chloroadamantane and 1-chlorobornane, 5-tert-butyl-1,3-di(1-chloro-1-methyl ethyl) benzene and similar compounds. Other suitable initiators are disclosed in U.S. Pat. Nos. 4,946,899, 3,560,458. These initiators are generally $C_5$ or greater tertiary or allylic alkyl or benzylic halides and may include polyfunctional initiators. Desirable examples of these initiators include: TMPCl, TMPBr, 2,6-dichloro-2,4,4,6-tetramethylheptane, cumyl chloride as well as 'di-' and 'tri-' cumyl chloride or bromide.

The selected diluent or diluent mixture should provide a diluent medium having some degree of polarity. To fulfil this requirement a mixture of nonpolar and polar diluent can be used but one or a mixture of polar diluents is preferred. Suitable nonpolar diluent components includes hydrocarbons and preferably aromatic or cyclic hydrocarbons or mixtures thereof. Such compounds include, for instance, methylcyclohexane, cyclohexane, toluene, carbon disulfide and others. Appropriate polar diluents include halogenated hydrocarbons, normal, branched chain or cyclic hydrocarbons. Specific compounds include the preferred liquid diluents such as ethyl chloride, methylene chloride, methylchloride (chloromethane), $CHCl_3$, $CCl_4$, n-butyl chloride, chlorobenzene, and other chlorinated hydrocarbons. To achieve suitable polarity and solubility, it has been found that if the diluent, or diluent mixture, is a mixture of polar and nonpolar diluents, the mixture is preferably at least 70% polar component, on a volume basis.

The relative polarity of the diluent can be described in terms of the dielectric constant of the diluent. In one embodiment, the diluent has a dielectric constant (as measured at from 20 to 25° C.) of greater than 5, and greater than 6 in another embodiment. In yet another embodiment, the dielectric constant of the diluent is greater than 7, and greater than 8 in yet another embodiment. In a desirable embodiment, the dielectric constant is greater than 9. Examples of dielectric constants (20-25° C.) for single diluents are: chloromethane (10), dichloromethane (8.9), carbon disulfide (2.6), toluene (2.4), and cyclohexane (2.0) as from CRC HANDBOOK OF CHEMISTRY AND PHYSICS 6-151 to 6-173 (D. R. Line, ed., 82 ed. CRC Press 2001).

As is typically the case, product molecular weights are determined by temperature, monomer and initiator concentration, the nature of the reactants, and similar factors. Consequently, different reaction conditions will produce products of different molecular weights and/or different monomer composition in the terpolymers. Synthesis of the desired reaction product will be achieved, therefore, through monitoring the course of the reaction by the examination of samples taken periodically during the reaction, a technique widely employed in the art and shown in the examples or by sampling the effluent of a reactor.

The present invention is not herein limited by the method of making the terpolymer. The terpolymer can be produced using batch polymerization or continuous slurry polymerization, for example, and on any volume scale. The reactors that may be utilized in the practice of the present invention include any conventional reactors and equivalents thereof. Preferred reactors include those capable of performing a continuous slurry process, such as disclosed in U.S. Pat. No. 5,417,930. The reactor pump impeller can be of the up-pumping variety or the down-pumping variety. The reactor will contain sufficient amounts of the catalyst system of the present invention effective to catalyze the polymerization of the monomer containing feed-stream such that a sufficient amount of polymer having desired characteristics is produced. The feed-stream in one embodiment contains a total monomer concentration greater than 30 wt % (based on the total weight of the monomers, diluent, and catalyst system), greater than 35 wt % in another embodiment. In yet another embodiment, the feed-stream will contain from 35 wt % to 50 wt % monomer concentration based on the total weight of monomer, diluent, and catalyst system. The bulk-phase, or phase in which the monomers and catalyst contact one another in order to react and form a polymer, may also have the same monomer concentrations.

The feed-stream or bulk-phase is substantially free from silica cation producing species in one embodiment of the invention. By substantially free of silica cation producing species, it is meant that there is no more than 0.0005 wt % based on the total weight of the monomers of silica species in the feed stream or bulk-phase. Typical examples of silica cation producing species are halo-alkyl silica compounds having the formula $R_1R_2R_3SiX$ or $R_1R_2SiX_2$, etc., wherein each "R" is an alkyl and "X" is a halogen.

The reaction conditions are typically such that desirable temperature, pressure and residence time are effective to maintain the reaction medium in the liquid state and to produce the desired polymers having the desired characteristics. The monomer feed-stream is typically substantially free of any impurity which is adversely reactive with the catalyst under the polymerization conditions. For example, the monomer feed preferably should be substantially free of bases (such as $K_2O$, NaOH, $CaCO_3$ and other hydroxides, oxides and carbonates), sulfur-containing compounds (such as $H_2S$, COS, and organo-mercaptans, e.g., methyl mercaptan, ethyl mercaptan), N-containing compounds, oxygen containing bases such as alcohols and the like. By "substantially free", it is meant that the above mentioned species are present, if at all, to an extent no greater than 0.0005 wt %.

In one embodiment, the ratio of monomers contacted together in the presence of the catalyst system ranges from 98 wt % isoolefin, 1.5 wt % styrenic monomer, and 0.5 wt % multiolefin ("98/1.5/0.5"), to a 50/25/25 ratio by weight of the total amount of monomers. For example, the isoolefin monomer may be present from 50 wt % to 98 wt % by total weight of the monomers in one embodiment, and from 70 wt % to 90 wt % in another embodiment. The styrenic monomers may be present from 1.5 wt % to 25 wt % by total weight of the monomers in one embodiment, and from 5 wt % to 15 wt % in another embodiment. The multiolefin may be present from 0.5 wt % to 25 wt % by total weight of the monomers in one embodiment, and from 2 wt % to 10 wt % in another embodiment, and from 3 wt % to 5 wt % in yet another embodiment.

The polymerization reaction temperature is conveniently selected based on the target polymer molecular weight and the monomer to be polymerized as well as standard process variable and economic considerations, for example, rate, temperature control, etc. The temperature for the polymerization is between –10° C. and the freezing point of the polymerization system in one embodiment, and from –25° C. to –120° C. in another embodiment. In yet another embodiment, the polymerization temperature is from –40° C. to –100° C., and from –70° C. to –100° C. in yet another embodiment. In yet another desirable embodiment, the temperature range is from –80° C. to –99° C. The temperature is chosen such that the desired polymer molecular weight is achieved, the range of which may comprise any combination of any upper limit and any lower limit disclosed herein.

The catalyst (Lewis Acid) to monomer ratio utilized are those conventional in this art for carbocationic polymerization processes. Particular monomer to catalyst ratios are desirable in continuous slurry or solution processes, wherein most any ratio is suitable for small, laboratory scale polymer synthesis. In one embodiment of the invention, the catalyst (Lewis acid) to monomer mole ratios will be from 0.10 to 20, and in the range of 0.5 to 10 in another embodiment. In yet another desirable embodiment, the ratio of Lewis Acid to initiator is from 0.75 to 2.5, or from 1.25 to 1.5 in yet another desirable embodiment. The overall concentration of the initiator is from 50 to 300 ppm within the reactor in one embodiment, and from 100 to 250 ppm in another embodiment. The concentration of the initiator in the catalyst feed stream is from 500 to 3000 ppm in one embodiment, and from 1000 to 2500 ppm in another embodiment. Another way to describe the amount of initiator in the reactor is by its amount relative to the polymer. In one embodiment, there is from 0.25 to 5.0 moles polymer/mole initiator, and from 0.5 to 3.0 mole polymer/mole initiator in another embodiment.

It is known that chlorine or bromine can react with unsaturation of the multiolefin derived units (e.g., isoprene residue units) rapidly to form halogenated polymer. Methods of halogenating polymers such as butyl polymers are disclosed in U.S. Pat. Nos. 2,964,489; 2,631,984; 3,099,644; 4,254,240; 4,554,326; 4,681,921; 4,650,831; 4,384,072; 4,513,116; and 5,681,901. Typical halogenation processes for making halobutyl rubbers involves injection of a desirable amount of chlorine or bromine into the cement (solution) of butyl rubber with the reactants being mixed vigorously in the halogenation reactor with a rather short resident time, typically less than 1 minute, following by neutralization of the HCl or HBr and any unreacted halogen. It is also well known in the art that the specific structure of the halogenated butyl rubber is complicated and is believed to depend on the halogenation condition. Most commercial bromobutyl rubbers are made under the condition that the formation of "structure III" type brominated moiety is minimized, as is the brominated terpolymer of the present invention. See, for example, *Anthony Jay Dias* in 5 POLYMERIC MATERIALS ENCYCLOPEDIA 3485-3492 (Joseph C. Salamone, ed., CRC Press 1996). That typically means the absence of free radical sources such as light or high temperature. Alternatively the halogenation can be carried out in polymer melt in an extruder or other rubber mixing devices in the absence of solvent.

The final level of halogen on the halogenated terpolymer, including halogen located on the polymer backbone and the styrenic moieties incorporated therein, depends on the application and desirable curing performance. The halogen content of a typical halogenated terpolymer of the present invention ranges from 0.05 wt % to 5 wt % by weight of the terpolymer in one embodiment, and from 0.2 wt % to 3 wt % in another embodiment, and from 0.8 wt % to 2.5 wt % in yet another embodiment. In yet another embodiment, the amount of halogen present on the terpolymer is less than 10 wt %, and less than 8 wt % in another embodiment, and less than 6 wt % in yet another embodiment. Stated another way, the amount of halogen incorporated into the terpolymer is from less than 5 mole % in one embodiment, and from 0.1 to 2.5 mole % relative to the total moles of monomer derived units in the terpolymer in another embodiment, and from 0.2 to 2 mole % in another embodiment, and from 0.4 to 1.5 mole % in yet another embodiment. A desirable level of halogenation may include any combination of any upper wt % or mole % limit with any lower wt % or mole % limit.

In another embodiment, the halogen content on the backbone (isoprene derived units) of a typical halogenated terpolymer of the present invention ranges from 0.05 wt % to 5 wt % by weight of the terpolymer in one embodiment, and from 0.2 wt % to 3 wt % in another embodiment, and from 0.8 wt % to 2.5 wt % in yet another embodiment. In yet another embodiment, the amount of halogen present on the terpolymer is less than 10 wt %, and less than 8 wt % in another embodiment, and less than 6 wt % in yet another embodiment. Stated another way, the amount of halogen incorporated into the terpolymer is from less than 5 mole % in one embodiment, and from 0.1 to 2.5 mole % relative to the total moles of monomer derived units in the terpolymer in another embodiment, and from 0.2 to 2 mole % in another embodiment, and from 0.4 to 1.5 mole % in yet another embodiment. A desirable level of halogenation may include any combination of any upper wt % or mole % limit with any lower wt % or mole % limit.

In yet another embodiment, the halogen content on the styrenic moieties, for example, p-methylstyrene (thus forming p-halomethylstyrene), was from 0.05 wt % to 5 wt %, and from 0.2 to 3 wt % in yet another embodiment, and from 0.2 wt % to 2 wt % in yet another embodiment, and from 0.2 wt % to 1 wt % in yet another embodiment, and from 0.5 wt % to 2 wt % in yet another embodiment.

The molecular weight, number average molecular weight, etc. of the terpolymer depends upon the reaction conditions employed, such as, for example, the amount of multiolefin present in the monomer mixture initially, the ratios of Lewis Acid to initiator, reactor temperature, and other factors. The terpolymer of the present invention has a number average molecular weight (Mn) of up to 1,000,000 in one embodiment, and up to 800,000 in another embodiment. In yet another embodiment, the terpolymer has an Mn of up to 400,000, and up to 300,000 in yet another embodiment, and up to 180,000 in yet another embodiment. The Mn value of the terpolymer is at least 80,000 in another embodiment, and at least 100,000 in yet another embodiment, and at least 150,000 in yet another embodiment, and at least 300,000 in yet another embodiment. A desirable range in the Mn value of the terpolymer can be any combination of any upper limit and any lower limit.

The terpolymer has a weight average molecular weight (Mw) of up to 2,0000,000 in one embodiment, and up to 1,000,000 in another embodiment, and up to 800,000 in yet another embodiment, and up to 500,000 in yet another embodiment. The Mw value for the terpolymer is at least 80,000 in yet another embodiment, and at least 100,000 in another embodiment, and at least 150,000 in yet another embodiment, and at least 200,000 in yet another embodiment. The desirable range in the Mw value of the terpolymer can be any combination of any upper limit and any lower limit.

The peak molecular weight value (Mp) of the terpolymer is at least 2,000,000 in one embodiment, 100,000 another one embodiment, and at least 150,000 in another embodiment, and at least 300,000 in yet another embodiment. The Mp value of the terpolymer is up to 600,000 in another embodiment, and up to 400,000 in yet another embodiment. The desirable range in the Mp value of the terpolymer can be any combination of any upper limit and any lower limit.

The terpolymer has a molecular weight distribution (Mw/Mn, or MWD) of less than 7.0 in one embodiment, and less than 4.0 in another embodiment, and from 1.5 to 3.8 in yet another embodiment. In yet another embodiment, the MWD value is from 2.0 to 3.5. The value MWD can be any combination of any upper limit value and any lower limit value.

Finally, the terpolymer of the invention has a Mooney viscosity (1+8, 125° C.) of from 20 to 60 MU in one embodiment, and from 25 to 70 MU in another embodiment, and from 30 to 50 in yet another embodiment, and from 50 to 70 MU in yet another embodiment.

The terpolymer and/or halogenated terpolymer may be part of a composition including other components such as one or more secondary rubber components, a cure system, especially a sulfur cure system, at least one filler such as carbon black or silica, and other minor components common in the rubber compounding arts. The terpolymer or halogenated terpolymer may be present from 5 phr to 100 phr in the composition one embodiment, from 20 phr to 100 phr in the composition in another embodiment, and from 30 phr to 90 phr in yet another embodiment, and from 40 phr to 80 phr in yet another embodiment, and from 20 phr to 50 phr in yet another embodiment, and from 15 phr to 55 phr in yet another embodiment, and up to 100 phr in another embodiment.

Secondary Rubber Component

A secondary rubber component may be present in compositions of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by *Subramaniam* in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NAT-SYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (Exxon-Mobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R. T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK- OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In one embodiment of the invention, a so called semicrystalline copolymer ("SCC") is present as the secondary "rubber" component. Semi-crystalline copolymers are described in WO00/69966. Generally, the SCC is a copolymer of ethylene or propylene derived units and $\alpha$-olefin derived units, the $\alpha$-olefin having from 4 to 16 carbon atoms in one embodiment, and in another embodiment the SCC is a copolymer of ethylene derived units and $\alpha$-olefin derived units, the $\alpha$-olefin having from 4 to 10 carbon atoms, wherein the SCC has some degree of crystallinity. In a further embodiment, the SCC is a copolymer of 1-butene derived units and another $\alpha$-olefin derived unit, the other $\alpha$-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Filler

Elastomeric compositions suitable for an air barrier of the invention may include one or more filler components such as calcium carbonate, clay, mica, silica and silicates, talc, titanium dioxide, starch and other organic fillers such as wood flower, and carbon black. In one embodiment, the filler is carbon black or modified carbon black. In one embodiment, the filler is reinforcing grade carbon black present at a level of from 10 to 150 phr, preferably 10 to 100 phr, of the composition, preferably from 30 to 120 phr, more preferably 40 to 80 phr. Useful grades of carbon black are described in RUBBER TECHNOLOGY 59-85 (1995) and range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762. Embodiments of the carbon black useful in, for example, innerliners or innertubes are N550, N650, N660, N762, N990, and Regal 85 (Cabot Corporation, Alpharetta, Ga.) and the like.

Modified carbon blacks may also be suitable as a filler. Such "modified carbon black" is disclosed in, for example, U.S. Pat. Nos. 3,620,792; 5,900,029; and 6,158,488. For example, the modified carbon black may comprise carbon black that has been subjected to treatment with a gas such as a nitrogen oxide, ozone, or other gas which may impart improved properties to the surface of the carbon black. The modified carbon black may also comprise, for example, a carbon black that has been contacted with a silanol-containing compound and/or a hydrocarbon radical such as an alkyl, aryl, alkylaryl and arylalkyl. The modified carbon black contacted with a silanol-containing compound can be prepared, for example, by contacting an organosilane such as an alkyl alkoxy silane with carbon black at an elevated temperature. Representative organosilanes include tetraakoxysilicates such as tetraethyoxysilicate. Alternatively, the modified carbon black can be prepared by co-fuming an organosilane and an oil in the presence of the carbon black at an elevated temperature. In yet another example preparing a modified carbon black, a diazonium salt can be contacted with the carbon black either with or without an electron source or with or without a protic solvent. Diazonium salts are known in the art and may be generated by contacting a primary amine, a nitrile and an acid (proton donor). The nitrile may be any metal nitrile, desirably a lithium nitrile, sodium nitrile, potassium nitrile, zinc nitrile, or some combination thereof, or any organic nitrile such as isoamylnitrile or ethylnitrile, or some combination of these.

Exfoliated clays may also be present in the composition. These clays, also referred to as "nanoclays", are well known, and their identity, methods of preparation and blending with polymers is disclosed in, for example, JP2000109635; JP2000109605; JP11310643; DE19726278; WO98/53000; U.S. Pat. Nos. 5,091,462; 4,431,755; 4,472,538; and 5,910,523. Swellable layered clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of from 4-20 Å in one embodiment, 8-12 Å in another embodiment, bound together and contain exchangeable cations such as $Na^+$, $Ca^{+2}$, $K^+$ or $Mg^{30\ 2}$ present at the interlayer surfaces.

The layered clay may be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{20}$ alkyls or alkenes which may be the same or different. In one embodiment, the exfoliating agent is a long chain tertiary amine, wherein at least $R_1$ is a $C_{14}$ to $C_{20}$ alkyl or alkene.

Another class of swelling agents include those which can be covalently bonded to the interlayer surfaces. These include polysilanes of the structure—$Si(R')_2R^2$ where R' is the same or different at each occurrence and is selected from alkyl, alkoxy or oxysilane and $R^2$ is an organic radical compatible or soluble with the matrix polymer of the composite.

Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538; 4,810,734; 4,889,885; as well as WO92/02582.

In one embodiment of the invention, the exfoliating additive is combined with the halogenated terpolymer. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-diociadecyl-methylamine, so called dihydrogenated tallowalkyl-methylamine and the like, and amine-terminated polytetrahydrofuran; long-chain thiol and thiosulfate compounds like hexamethylene sodium thiosulfate. In another embodiment of the invention, improved interpolymer impermeability is achieved by the presence of polyfunctional curatives such as hexamethylene bis(sodium thiosulfate) and hexamethylene bis(cinnamaldehyde).

In yet another embodiment of the composition, the filler may be a mineral filler such as silica. A description of desirable mineral fillers is described by Walter H. Waddell and Larry R. Evans in RUBBER TECHNOLOGY, COMPOUNDING AND TESTING FOR PERFORMANCE 325-332 (John S. Dick, ed. Hanser Publishers 2001). Such mineral fillers include calcium carbonate and other alkaline earth and alkali metal carbonates, barium sulfate and other metal sulfates, ground crystalline silica, biogenic silica, such as from dolomite, kaolin clay and other alumina-silicate clays, talc and other magnesium-silica compounds, alumina, metal oxides such as titanium oxide and other Group 3-12 metal oxides, any of which named above can be precipitated by techniques known to those skilled in the art. Particularly desirable mineral fillers include precipitated silicas and silicates. Other suitable non-black fillers and processing agents (e.g., coupling agents) for these fillers are disclosed in the BLUE BOOK 275-302, 405-410 (Lippincott & Peto Publications, RubberWorld 2001).

When such mineral fillers are present, it is desirable to also include organosilane coupling agents. The coupling agent is typically a bifunctional organosilane cross-linking agent. By an "silane coupling agent" is meant any silane coupled filler and/or cross-linking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In a preferred embodiment, bis-(3(triethoxysilyl)-propyl)-tetrasulfane (sold commercially as Si69 by Degussa AG, Germany) is employed. Preferably, the organosilane-coupling agent composes from 2 to 15 weight percent, based on the weight of filler, of the elastomeric composition in one embodiment. More preferably, it composes from 4 to 12 weight percent of the filler in yet another embodiment.

The filler component of the elastomer composition may be present in a range from up to 120 phr in one embodiment, from up to 100 phr in another embodiment, and from up to 60 phr in yet another embodiment. In yet another embodiment, the filler is present from 5 phr to 80 phr, from 50 phr to 80 phr in yet another embodiment, from 20 phr to 80 phr in yet another embodiment, from 10 phr to 70 phr in yet another embodiment, from 50 phr to 70 phr in yet another embodiment, and from 60 phr to 90 phr in yet another embodiment, wherein a desirable range can by any combination of any upper phr limit and any lower phr limit.

Curing Agents and Accelerators

The compositions produced in accordance with the present invention typically contain other components and additives customarily used in rubber mixes, such as pigments, accelerators, cross-linking and curing materials, antioxidants, antiozonants, and fillers.

Generally, polymer compositions, for example, those used to produce tires, are crosslinked. It is known that the physical properties, performance characteristics, and durability of vulcanized rubber compounds are directly related to the number (crosslink density) and type of crosslinks formed during the vulcanization reaction. (See, e.g., W. Helt et al., *The Post Vulcanization Stabilization for NR*, RUBBER WORLD 18-23 (1991). Cross-linking and curing agents include sulfur, zinc oxide, and fatty acids. Peroxide cure systems may also be used.

More particularly, in a desirable embodiment of the composition of the invention, a "sulfur cure system" is present in the composition. The sulfur cure system of the present invention includes at least one ore more sulfur compounds such as elemental sulfur, and may include sulfur-based accelerators. Generally, the terpolymer compositions may also include other curative components such as, for example sulfur, metal oxides (e.g., zinc oxide), organometallic compounds, radical initiators, etc. followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with a corresponding metal complex, or with a corresponding agent such as a $C_6$ to $C_{30}$ fatty acid such as stearic acid, etc. (e.g., $Zn(Stearate)_2$, $Ca(Stearate)_2$, $Mg(Stearate)_2$, and $Al(Stearate)_3$), and either a sulfur compound or an alkylperoxide compound. (See also, *Formulation Design* and *Curing Characteristics of NBR Mixes for Seals*, RUBBER WORLD 25-30 (1993). This method may be accelerated and is often used for the vulcanization of elastomer compositions. The sulfur cure system of the present invention includes at least sulfur, typically elemental sulfur, and may also include the metal oxides, accelerators and phenolic resins disclosed herein.

Accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoafe (ZEH), N,N'-diethyl thiourea.

The compositions of the invention may also include processing oils and resins such as paraffinic, polybutene, naphthenic or aliphatic resins and oils. Processing aids include, but are not limited to, plasticizers, tackifiers, extenders, chemical conditioners, homogenizing agents and peptizers such as mercaptans, petroleum and vulcanized vegetable oils, waxes, resins, rosins, and the like. The aid is typically present from 1 to 70 phr in one embodiment, from 5 to 60 phr in another embodiment, and from 10 to 50 phr in yet another embodiment. Some commercial examples of processing aids are SUNDEX™ (Sun Chemicals), FLEXON™ and PARAPOL™ (ExxonMobil Chemical), and CALSOL™ (R. E. Carroll). Other suitable additives are described by Howard L. Stevens in RUBBER TECHNOLOGY 20-58 (1995), especially in Tables 2.15 and 2.18.

In one embodiment of the invention, at least one curing agent(s) is present from 0.2 to 15 phr, and from 0.5 to 10 phr in another embodiment, and from 2 phr to 8 phr in yet another embodiment. Curing agents include those components described above that facilitate or influence the cure of elastomers, such as metals, accelerators, sulfur, peroxides, and other agents common in the art.

The compositions may be vulcanized (cured) by any suitable means such as by subjecting them using heat or radiation according to any conventional vulcanization process. The amount of heat or radiation ("heat") is that required to affect a cure in the composition, and the invention is not herein limited to the method and amount of heat required to cure the composition in forming a stock material or article. Typically, the vulcanization is conducted at a temperature ranging from about 100° C. to about 250° C. in one embodiment, from 150° C. to 200° C. in another embodiment, for about 1 to 150 minutes.

Suitable elastomeric compositions for such articles as tire innerliners or innertubes may be prepared by using conventional mixing techniques including, e.g., kneading, roller milling, extruder mixing, internal mixing (such as with a Banbury™ mixer) etc. The sequence of mixing and temperatures employed are well known to the skilled rubber compounder, the objective being the dispersion of fillers, activators and curatives in the polymer matrix without excessive heat buildup. A useful mixing procedure utilizes a Banbury™ mixer in which the polymer rubber, carbon black and plasticizer are added and the composition mixed for the desired time or to a particular temperature to achieve adequate dispersion of the ingredients. Alternatively, the rubber and a portion of the carbon black (e.g., one-third to two thirds) is mixed for a short time (e.g., about 1 to 3 minutes) followed by the remainder of the carbon black and oil. Mixing is continued for about 1 to 10 minutes at high rotor speed during which time the mixed components reach a temperature of about 140° C. Following cooling, the components are mixed in a second step on a rubber mill or in a Banbury™ mixer during which the curing agent and optional accelerators, are thoroughly and uniformly dispersed at relatively low temperature, e.g., about 80° C. to about 105° C., to avoid premature curing of the composition. Variations in mixing will be readily apparent to those skilled in the art and the present invention is not limited to any specific mixing procedure. The mixing is performed to disperse all components of the composition thoroughly and uniformly.

An innerliner stock is then prepared by calendering or extruding the compounded rubber composition into a sheet having a thickness of roughly 40 to 100 mil gauge and cutting the sheet material into strips of appropriate width and length for innerliner applications in the tire building operation. The liner can then be cured while in contact with the tire carcass and/or sidewall in which it is placed.

An innertube stock is prepared by extruding the compounded rubber composition into a tubular shape having a thickness of from 50 to 150 mil gauge and cutting the extruded material into a length of appropriate size. The tubes of extruded material are then second cut and the ends spliced together to form the green tube. The tube is then cured to form the finished innertube either by heating from 25° C. to 250° C., or exposure to radiation, or by other techniques known to those skilled in the art.

Test Methods

Cure properties were measured using a MDR 2000 at the indicated temperature and 0.5 degree arc. Test specimens were cured at the indicated temperature, typically from 150° C. to 160° C., for a time (in minutes) corresponding to T90+ appropriate mold lag. When possible, standard ASTM tests were used to determine the cured compound physical properties. Stress/strain properties (tensile strength, elongation at break, modulus values, energy to break) were measured at room temperature using an Instron 4202 or Instron 4204. Shore A hardness was measured at room temperature by using a Zwick Duromatic. Abrasion loss was determined at room temperature by weight difference by using an APH-40 Abrasion Tester with rotating sample holder (5 N counter balance) and rotating drum. Weight losses were indexed to that of the standard DIN compound with lower losses indicative of a higher DIN abrasion resistance index. The weight losses can be measured with an error of ±5%.

Temperature-dependent (−80° C. to 60° C.) dynamic properties (G*, G', G" and tangent delta) were obtained using a Rheometrics ARES. A rectangular torsion sample geometry was tested at 1 or 10 Hz and 2% strain. The temperature-dependent tangent delta curve (such as generated in, e.g., FIG. 1) maximizes at a temperature affording information used to predict tire performance. The tangent delta values are measured with an error of ±5%, while the temperature is measured with an error of ±2° C. Values of G" or tangent delta measured in the range from −10° C. to 10° C. in laboratory dynamic testing can be used as predictors of tire wet traction, while values of from −20° C. to −40° C. are used to predict winter traction. Values of tangent delta measured in the range of from 50° C. to 70° C. in laboratory dynamic testing can be used as predictors of tire rolling resistance.

Gel permeation chromatography was used to determine molecular weight data for the terpolymers. The values of number average molecular weight (Mn), weight average molecular weight (Mw) and peak molecular weight (Mp) obtained have an error of ±20%. The techniques for determining the molecular weight and molecular weight distribution (MWD) are generally described in U.S. Pat. No. 4,540,753 to Cozewith et al. and references cited therein, and in Verstrate et al., 21 MACROMOLECULES 3360 (1988). In a typical measurement, a 3-column set is operated at 30° C. The elution solvent used may be stabilized tetrahydrofuran (THF), or 1,2,4-trichlorobenzene (TCB). The columns are calibrated using polystyrene standards of precisely known molecular weights. A correlation of polystyrene retention volume obtained from the standards, to the retention volume of the polymer tested yields the polymer molecular weight.

$^1$H- and decoupled $^{13}$C-NMR spectroscopic analyses were run in either CDCl$_3$ or toluene-d$_8$ at ambient temperature using a field strength of 250 MHz ($^{13}$C-63 MHz) or in tetrachloroethane-d$_2$ at 120° C. using a field strength of 500 MHz ($^{13}$C-125 MHz) depending upon the sample's solubility. Incorporation (mol %) of isobutylene and isoprene into the terpolymers of all examples was determined by comparison the integration of the methyl proton resonances with those of the methylene proton resonances and resonances specific for the PMS.

Oxygen permeability was measured using a MOCON OxTran Model 2/61 operating under the principle of dynamic measurement of oxygen transport through a thin film as published by R. A. Pasternak et al. in 8 JOURNAL OF POLYMER SCIENCE: PART A-2 467 (1970). The units of measure are cc-mil/m $^2$-day-mmHg. Generally, the method is as follows: flat film or rubber samples are clamped into diffusion cells which are purged of residual oxygen using an oxygen free carrier gas at 60° C. The carrier gas is routed to a sensor until a stable zero value is established. Pure oxygen or air is then introduced into the outside of the chamber of the diffusion cells. The oxygen diffusing through the film to the inside chamber is conveyed to a sensor which measures the oxygen diffusion rate.

Air permeability was tested by the following method. Thin, vulcanized test specimens from the sample compositions were mounted in diffusion cells and conditioned in an oil bath at 65° C. The time required for air to permeate through a given specimen is recorded to determine its air permeability. Test specimens were circular plates with 12.7-cm diameter and 0.38-mm thickness. The error (2σ) in measuring air permeability is ±0.245 (×10$^8$) units. Other test methods are described in Table 2.

Adhesion to SBR Test. This test method, the "adhesion to SBR" or "adhesion T-peel" test is based on ASTM D413. This test is used to determine the adhesive bond strength between two rubber compounds, the same or different, after curing. Generally, the compounds used to make up the rubber (elastomeric) compositions are prepared on a three-roll mill to a thickness of 2.5 mm. An adhesive backing fabric is placed on the back of each compound. Typically, approximately 500 grams of stock blended elastomeric composition yields 16 samples which is enough for 8 adhesion tests in duplicate, wherein the calender is set to 2.5 mm guides spaced 11 cm apart.

The face of the two compounds are pressed and bonded to one another. A small Mylar tab is placed between the two layers of rubber compositions (SBR and test composition) on one end to prevent adhesion, and to allow approximately 2.5 inches (6.35 cm) of tab area. The samples are then cure bonded in a curing press at the specified conditions. Die out 1 inch (2.54 cm) ×6 inch (15.24 cm) specimen from each molded vulcanized piece. The tab of each specimen is held by a powered driven tensioning machine (Instron 4104, 4202, or 1101) and pulled at 180° until separation between the two rubber compositions occurs. Force to obtain separation and observations are then reported.

Other test methods are summarized in Table 1.

EXAMPLES

The present invention, while not meant to be limiting by, may be better understood by reference to the following examples and Tables. The following symbols are used throughout this description to describe rubber components of the invention: IBIMS {terpolymer; poly(isobutylene-co-p-methylstyrene-co-isoprene)}; BrIBIMS {(brominated terpolymer; brominated poly(isobutylene-co-p-methylstyrene-co-isoprene)}; IBMS {poly(isobutylene-co-p-methylstyrene)}; BrIBMS {poly(isobutylene-co-p-methylstyrene-co-p-bromomethylstyrene)}; SBB {brominated star branched butyl rubber (poly(isobutylene-co-isoprene))}; BR {polybutadiene}; NR {natural rubber}; SBR {styrene-butadiene rubber}; and BIIR {brominated poly(isobutylene-co-isoprene)}.

The synthesis of the terpolymer useful in the invention was carried out in a set of 6 sample batch runs. Tertiary-butylchloride (t-BuCl) was the initiator used in runs A-F, data for which is shown in Table 3A.

For the runs A-F, the batch experiments were 250 mL reactions in chloromethane at an initial temperature of −93° C. The initiator used in the examples was t-butylchloride (Aldrich Chemical Co.) and the Lewis acid catalyst used was 25 wt % solution of EADC (ethylaluminumdichloride) in heptane. The t-butylchloride initiator and EADC catalyst were pre-mixed at 3/1 molar ratio in chloromethane and diluted to a final total concentration of about 1 wt % solution in chloromethane.

The isobutylene used in the examples was dried by passing the isobutylene vapor through drying columns, and then condensed in a clean flask in a dry box prior to use. The p-methylstyrene and isoprene monomers used in the examples were distilled under vacuum to remove moisture and free radical inhibitor prior to use. The monomer feed blend used in the terpolymer synthesis of runs A-F was a 10 wt % total monomers in chloromethane with 80/10/10 wt % ratio of isobutylene/isoprene/p-methylstyrene.

The terpolymerization experiments were carried out in 500 ml glass reactors in a standard nitrogen atmosphere enclosure box (dry box) equipped with a cooling bath for low temperature reactions. Each polymerization batch used 250 ml of the monomer feed blend contained 80/10/10 wt % ratio of isobutylene/isoprene/p-methylstyrene at 10 wt % total monomers in chloromethane. After the monomer solution was cooled down to desired reaction temperature (<−90° C.), the pre-chilled initiator/catalyst mixture solution was added slowly to the reactor to initiate the polymerization. The rate of catalyst solution addition was controlled to avoid excessive temperature buildup in the reactor. Thus, catalyst was added incrementally to the bulk-phase within the reactor. The amount of total catalyst solution added was adjusted based on, among other factors, the accumulated temperature increases that correlate with amount of monomers consumed in the reactor. When desirable monomer conversion was reached (e.g., at least 50% conversion), a small amount of methanol was added to the reactor to quench the polymerization reactions. The terpolymer was then isolated and dried in a vacuum oven for analysis.

The molecular weight and molecular weight distribution (Mw/Mn) of the resultant terpolymers were analyzed by standard Gel Permeation Chromatography (GPC) techniques known in the art (described above). The GPC analysis results of the terpolymers are shown in Table 3. The mole % ratios of monomer derived units in the final terpolymers obtained by standard proton NMR technique are also shown in Table 3A. The composite amount of unsaturated groups (also corresponding to the level of isoprene {IP}) in the terpolymer of runs A-F is 4.14 mole %. The composite amount of PMS in the final terpolymer of runs A-F is 4.64 mole %.

Bromination of the A-F terpolymer composite was carried out in standard round bottomed flasks using 5 wt % terpolymer solution in cyclohexane. In order to minimize free radical bromination, the reactor was completely shielded from light and a small amount (about 200 ppm based on polymer charge) of BHT free radical inhibitor was added in the polymer solution. A 10 wt % bromine solution in cyclohexane was prepared and transferred into a graduated addition funnel attached to the reactor. Desired amount of the bromine solution was then added dropwise into the terpolymer solution with vigorous agitation. The bromination reaction was quenched with excessive caustic solution 2-5 minutes after the bromine addition was completed. The excess caustic in the neutralized terpolymer solution was then washed with fresh water in separatory funnel several times. The brominated terpolymer was isolated by solvent precipitation in methanol and then dried in vacuum oven at moderate temperature overnight.

Bromination resulted mostly in bromination of the unsaturation in the backbone of the terpolymer, with some bromination of the PMS. The level of bromine in the composite sample on the backbone is 0.80 mole %, and 0.06 mole % on the PMS as determined by NMR (total 0.86 mole % bromine). This sample was used in example 3. Another batch of terpolymer was subjected to bromination similarly to that above, resulting in a composite bromine level of 1.1 mole % (±10%). This sample was used for example 7.

In demonstrating the cure characteristics of the IBIMS, the A-F composite, and other comparative compounds, examples 1-3 were mixed in two stages using a Haake Rheomix™ 600 internal mixer. Elastomers, fillers, and processing oil were mixed in the first step. Ingredients are listed in Table 3. The second step consisted of mixing the first step masterbatch and adding all other chemical ingredients. Mixing continued for three minutes or until a temperature of 110° C. was reached. An open two-roll mill was used to sheet out the stocks after each Haake mixing step.

Examples of the compositions (1-7) used to study the cure characteristics of the terpolymer are found in Table 4, the properties of which are summarized in Table 5. Samples 1-7 represent the terpolymer in comparison with other known rubbers. Each sample 1-7 includes 60 phr N666 carbon black; 4 phr SP-1068 resin; 7 phr STRUKTOL 40 MS; 1 phr stearic acid; 8 phr CALSOL 810 processing oil; 0.15 phr MAGLITE-K; 1 phr KADOX 911 zinc oxide; 0.5 phr sulfur; and 1.25 phr MBTS. The cure properties are summarized in Table 5, and the physical characteristics are summarized in Table 6. Aged properties of samples 4-7, and adhesion to SBR tests, are summarized in Table 7. Finally, the dynamic properties (tangent delta) values of examples 4-7 are summarized in Table 8 and FIG. 1.

The results of the physical studies outlined in Tables 5-7 show that the BrIBIMS Compound 7 has similar cure properties to the other isobutylene-based polymers studied: bromobutyl rubber, star-branched bromobutyl rubber and BIMS. Slightly lower mechanical properties (100% and 300% modulus, tensile and energy to break values) are obtained primarily thought due to the lower molecular weight of the BrIBIMS terpolymer (see Table 6) as indicated by the much lower Mooney viscosity value obtained for the innerliner compound. The BrIBIMS innerliner Compound 7 has the same desirably low air permeability as the other isobutylene elastomers. However, surprisingly in spite of this low molecular weight the BrIBIMS Compound 7 has higher abrasion resistance values than the bromobutyl rubber (5) or star-branched bromobutyl rubber (4) innerliners and is comparable to the BIMS Compound 6. In addition, the BrIBIMS Compound 7 has higher adhesion to a SBR carcass compound and a higher tear strength than does the BIMS Compound 6.

Dynamic property testing shows that the BrIBIMS terpolymer Compound 7 has higher tangent delta values at temperatures between +30° C. and −20° C. indicating potential improved dry, wet and winter traction properties, see FIG. 1. This property is useful in rubber products where traction or grip is an important performance property such as in tire treads, shoe outsoles, and power transmission belts. Table 8 is a summary of the results shown in FIG. 1.

The examples 3 and 7 above were performed using a BrIBIMS terpolymer having a collective (combination of several batches) number average molecular weight of about 90,000. Given this relatively low molecular weight, it is surprising that the adhesion to SBR value in Table 7 is as high as 70 N/mm. Thus, while the tensile strength and energy to break values of the example 7 BrIBIMS are low relative to, for example BIIR, this would be expected for a polymer having the relatively low number average molecular weight exhibited in the example 7 BrIBIMS. In a prospective example BrIBIMS, the number average molecular weight of the terpolymer is between 300,000 and 800,000, or between 300,000 and 600,000 in another embodiment. This terpolymer may be achieved by adjusting the reaction conditions such as the identity and/or quantity of initiator, the reactor temperature, and other factors. This 300,000 to 800,000 number average molecular weight BrIBIMS terpolymer would be expected to exhibit a further improved adhesion to SBR value of from 80 to 300 N/mm or greater. The DIN Abrasion Index of this higher MW terpolymer would be greater than 60 in one embodiment, and greater than 70 in yet another embodiment, and greater than 80 in yet another embodiment. Finally, the Mooney viscosity (ML (1+4) at 100° C.) of the 300,000 to 800,000 number average molecular weight BrIBIMS terpolymer would be from 50 to 70 units.

Thus, in a desirable embodiment, the terpolymer of the invention, with a filler and alternatively with other additional rubbers and other components, exhibits an adhesion to SBR value at 100° C. of from greater than 70 N/mm in one embodiment, greater than 80 N/mm in another embodiment, greater than 100 N/mm in yet another embodiment, and greater than 200 N/mm in yet another embodiment, and from 70 to 400 N/mm in one embodiment, and from 80 to 300 N/mm in yet another embodiment.

The terpolymer of the present invention, in combination with a suitable filler, and alternatively, one or more additional secondary rubbers, can be cured by any suitable means to form various useful articles. In particular, the cured terpolymers of the invention are suitable for automotive tire components such as treads, sidewalls and, particularly suitable for tire innerliners, innertubes, and other applications where air barrier qualities are desirable. The terpolymer, or compositions of the terpolymer, may also be suitable for such articles as belts and hoses, vibrational damping devices, pharmaceutical stoppers and plungers, shoe soles and other shoe components, and other devices where air impermeability and flexibility are important.

The composition of the present invention may be used in producing innerliners for motor vehicle tires such as truck tires, bus tires, passenger automobile tires, motorcycle tires, off the road tires, and the like. The oxygen permeability (MOCON) of the cured compositions of the invention is less than $10 \times 10^{-8}$ cm$^3$·cm/cm$^2$·sec·atm at 65° C. in one embodiment, less than $9.5 \times 10^{-8}$ cm$^3$·cm/cm$^2$·sec·atm at 65° C. in another embodiment, and less than $9.0 \times 10^{-8}$ cm$^3$·cm/cm$^2$·sec·atm at 65° C. in yet another embodiment, and less than $8.5 \times 10^{-8}$ cm$^3$·cm/cm$^2$·sec·atm at 65° C. in yet another embodiment; and the oxygen permeability may range from $0.1 \times 10^{-8}$ to $10 \times 10^{-8}$ cm$^3$·cm/cm$^2$·sec·atm at 65° C. in one embodiment, and from $1 \times 10^{-8}$ to $9 \times 10^{-8}$ cm$^3$·cm/cm$^2$·sec·atm at 65° C. in another embodiment, and from $1.5 \times 10^{-8}$ to $9 \times 10^{-8}$ cm$^3$·cm/cm$^2$·sec·atm at 65° C. in yet another embodiment.

The cured composition of the present invention, in combination with a suitable filler, and alternately, an additional rubber and other components, may have a DIN Abrasion Index of from greater than 45 in one embodiment, and greater than 50 in another embodiment, and greater than 52 in yet another embodiment; and a DIN Abrasion Index from 30 to 80 in yet another embodiment, and from 40 to 70 in yet another embodiment, and from 45 to 65 in yet another embodiment.

Also, the cured composition of the present invention, in combination with a suitable filler, and alternately, an additional rubber and other components, may have a Tangent Delta (G"/G') value at −30° C. of greater than 0.60 in one embodiment, and greater than 0.70 in another embodiment, and greater than 0.80 in yet another embodiment, and from 0.50 to 1.2 in yet another embodiment, from 0.60 to 1.1 in yet another embodiment, and from 0.70 to 1.1 in yet another embodiment. The Tangent Delta (G"/G') value at 0° C. of the cured composition may be greater than 0.20 in one embodiment, and greater than 0.25 in another embodiment, and greater than 0.30 in yet another embodiment, and from 0.20 to 0.80 in yet another embodiment, from 0.25 to 0.70 in yet another embodiment, and from 0.25 to 0.65 in yet another embodiment. Compositions of the terpolymer would be expected, based on the tangent delta values at 60° C., to have a similar heat buildup relative to the other components of, for example, a tire. Thus, there would be no hysteresis expected in using the terpolymer of the present invention in innerliners and innertubes.

The present invention includes the use of the terpolymer described and characterized above in various compositions, and the method of making the terpolymer and compositions. One embodiment of the present invention is an elastomeric composition suitable for an air barrier comprising a filler; a sulfur cure system; and at least one halogenated terpolymer of $C_4$ to $C_8$ isoolefin derived units, $C_4$ to $C_{14}$ multiolefin derived units, and p-alkylstyrene derived units.

Alternatively, the present invention can be described as a cured elastomeric composition comprising at least one halogenated terpolymer of $C_4$ to $C_8$ isoolefin derived units, $C_4$ to $C_{14}$ multiolefin derived units, and p-alkylstyrene derived units, wherein the composition is cured in the presence of a sulfur cure system; and wherein the adhesion to SBR value at 100° C. of the cured composition is from greater than 70 N/mm.

The elastomeric composition may include at least one metal oxide, elemental sulfur, and optionally at least one accelerator in one embodiment.

The filler of the elastomeric composition may be selected from carbon black, silica, alumina, calcium carbonate, clay, mica, talc, titanium dioxide, starch, wood flower, and mixtures thereof in another embodiment.

The elastomeric composition may also include a secondary rubber in another embodiment, wherein the secondary rubber is selected from natural rubber, polybutadiene rubber, nitrile rubber, silicon rubber, polyisoprene rubber, poly (styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly (isobutylene-co-isoprene) rubber; halogenated poly(isobutylene-co-p-methylstyrene) and mixtures thereof.

In another embodiment of the elastomeric composition of the invention, the $C_4$ to $C_8$ isoolefin monomer is isobutylene; and the $C_4$ to $C_{14}$ multiolefin monomer is isoprene in another embodiment; and the p-alkylstyrene is p-methylstyrene in yet another embodiment.

In yet another embodiment of the elastomeric composition, the terpolymer is brominated.

The bromine level of the terpolymer of the elastomeric composition may be in the range of from 0.1 mole % to 2.5 mole % based on the total moles of monomer derived units in the terpolymer in one embodiment, and from 0.2 mole % to 2 mole % based on the total moles of monomer derived units in the terpolymer.

In yet another embodiment of the elastomeric composition, the terpolymer has a number average molecular weight of from 300,000 to 800,000. In yet another embodiment, the filler is carbon black, or blend of carbon black and silica or an exfoliated clay in another embodiment.

The composition has certain desirable properties that make it suitable for such articles as tire and shoe components, particularly in air barriers. In one embodiment, the adhesion to SBR value at 100° C. is greater than 100 N/mm, and greater than 200 N/mm in another embodiment.

The elastomeric composition has a DIN Abrasion Index of greater than 45 units in one embodiment, and a tangent delta value of from greater than 0.60 at −30° C. in another embodiment and a tangent delta value of from greater than 0.20 at 0° C. in yet another embodiment. The elastomeric composition is thus suitable for such articles as tire innerliners and treads, sidewalls, etc.

The present invention also includes an improved method of making a BrIBIMS terpolymer and compositions of the terpolymer. A method of producing an elastomeric terpolymer composition includes combining, in a diluent, $C_4$ to $C_8$ isoolefin monomers, $C_4$ to $C_{14}$ multiolefin monomers, and p-alkylstyrene monomers in the presence of a Lewis acid and at least one initiator to produce the terpolymer.

In one embodiment of the method of making the terpolymer, the initiator is described by the following formula:

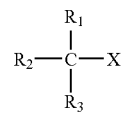

wherein X is a halogen; $R_1$ is selected from hydrogen, $C_1$ to $C_8$ alkyls, and $C_2$ to $C_8$ alkenyls, aryl, and substituted aryl; $R_3$ is selected from $C_1$ to $C_8$ alkyls, $C_2$ to $C_8$ alkenyls, aryls, and substituted aryls; and $R_2$ is selected from $C_4$ to $C_{200}$ alkyls in one embodiment, and from $C_4$ to $C_{50}$ alkyls in another embodiment, $C_2$ to $C_8$ alkenyls, aryls, and substituted aryls, $C_3$ to $C_{10}$ cycloalkyls, and

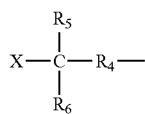

wherein X is a halogen; $R_5$ is selected from $C_1$ to $C_8$ alkyls, and $C_2$ to $C_8$ alkenyls; $R_6$ is selected from $C_1$ to $C_8$ alkyls, $C_2$ to $C_8$ alkenyls aryls, and substituted aryls; and $R_4$ is selected from phenylene, biphenyl, α,ω-diphenylalkane and $-(CH_2)_n-$, wherein n is an integer from 1 to 10; and wherein $R_1$, $R_2$, and $R_3$ can also form adamantyl or bornyl ring systems.

In another embodiment of the method of making the terpolymer, the Lewis acid is selected from of aryl aluminum halides, alkyl-substituted aryl aluminum halides, alkyl aluminum halides and a mixture thereof.

The Lewis acid is selected from the group of dialkyl aluminum halide, monoalkyl aluminum dihalide, aluminum tri-halide, ethylaluminum sesquichloride, and a mixture thereof in one embodiment, and is selected from $AlCl_3$, $EtAlCl_2$, $Et_{1.5}AlCl_{1.5}$, $Et_2AlCl$, and mixtures thereof in another embodiment.

In yet another embodiment of the method of making the terpolymer and composition, the dielectric constant of the diluent is greater than 6 at 20° C., and greater than 9 at 20° C. in another embodiment. In another embodiment, the diluent is selected from methylcyclohexane, cyclohexane, toluene, carbon disulfide, ethyl chloride, methylchloride, methylene chloride, $CHCl_3$, $CCl_4$, n-butyl chloride, chlorobenzene, and mixtures thereof.

The method further includes the step of halogenating the terpolymer in another embodiment.

In another embodiment of the method of making the terpolymer, the temperature for the polymerization is between −10° C. and the freezing point of the polymerization system.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Test Methods

| Parameter | Units | Test |
|---|---|---|
| Mooney Viscosity (BIMS polymer) | ML 1 + 8, 125° C., MU | ASTM D 1646 (modified) |
| Mooney Viscosity (composition) | ML 1 + 4, 100° C., MU | ASTM D 1646 |
| Brittleness | ° C. | ASTM D 746 |
| Mooney Scorch Time | $T_s5$, 125° C., minutes | ASTM D 1646 |
| Moving Die Rheometer (MDR) @ 160° C., ±0.5° arc | | |
| ML | dNewton · m | |
| MH | dNewton · m | |
| $T_s2$ | minute | |
| $T_c90$ | minute | |
| Cure rate | dN · m/minute | ASTM D 2084 |
| Physical Properties press cured Tc 90 + 2 min @ 160° C. | | |
| Hardness | Shore A | ASTM D 2240 |
| Modulus | MPa | ASTM D 412-68 |
| Tensile Strength | MPa | |
| Elongation at Break | % | |
| Rebound | % | Zwick 5901.01 Rebound Tester ASTM D1054 or ISO 4662 or DIN 53512 |
| Dispersion D scale | — | DisperGrader 1000 (Optigrade, Sweden) |
| Abrasion Resistance (ARI) | — | ISO 4649 or DIN 53516 |
| Energy | N/mm | Area under the Elongation at break curve. |
| Tangent Delta | — | Rheometrics ARES |

TABLE 2

Components and Commercial Sources

| Component | Brief Description | Commercial Source |
|---|---|---|
| Budene ™ 1207 | polybutadiene | Goodyear (Akron, OH) |

TABLE 2-continued

Components and Commercial Sources

| Component | Brief Description | Commercial Source |
|---|---|---|
| BIIR 2222 | brominated poly(isobutylene-co-isoprene), Mooney viscosity of 40–60 MU (1 + 8, 125° C.), 2 wt % bromine | ExxonMobil Chemical Company (Houston, TX) |
| CALSOL 810 | processing oil; naphthenic oil | R. E. Carroll (Trenton, NJ) |
| EADC | ethyl aluminum dichloride | AKZO Nobel Chemical |
| EXXPRO ™ 89-4 | 5 wt % PMS, 0.75 mol % BrPMS, Mooney viscosity of 45 ± 5 MU (1 + 8, 125° C.) | ExxonMobil Chemical Company (Houston, TX) |
| Isobutylene | monomer | ExxonMobil Chemical Company (Houston, TX) |
| Isoprene | monomer | Aldrich Chemical Company |
| MAGLITE-K | cure agent, magnesium oxide | C. P. Hall (Chicago, IL) |
| MBTS | 2,2'-benzothiazyl disulfide | Sovereign Chemical Co. (Akron, OH) |
| p-methylstyrene (PMS) | monomer | Aldrich Chemical Company |
| SP-1068 | brominated phenol-formaldehyde resin | Schenectady International (Schenectady, NY) |
| SBB 6222 | star-branched butyl rubber; 2 wt % Br | ExxonMobil Chemical Company (Houston, TX) |
| STRUKTOL 40MS | mixture of aliphatic, aromatic and naphthenic resins | Struktol (Stow, OH) |
| Stearic acid | cure agent | e.g., C. K. Witco Corp. (Taft, LA) |
| Sulfur | cure agent | e.g., R. E. Carroll (Trenton, NJ) |
| zinc oxide, KADOX ™ 911 | cure agent, zinc oxide | Zinc Corp. of America (Monaca, PA) |

TABLE 3

Reaction conditions and results for runs A–F to produce terpolymer using t-butylchloride as the initiator.

| Condition | A | B | C | D | E | F | Composite (A–F) |
|---|---|---|---|---|---|---|---|
| Moles monomer | 0.390 | 0.390 | 0.390 | 0.390 | 0.390 | 0.390 | — |
| Volume Catalyst solution added (mL)† | 48.0 | 66.0 | 75.5 | 50.0 | 51.5 | 65.5 | — |
| Change in temperature, ° C. | 9.9 | 9.7 | 8.8 | 9.6 | 9.1 | 9.8 | — |
| Reaction time (min) | 20.8 | 20.8 | 20.5 | 18.0 | 15.0 | 17.5 | — |
| % conversion | 64.72 | 68.40 | 69.24 | 61.64 | 58.68 | 59.68 | — |
| Mn | 91,600 | 82,800 | 75,100 | 94,100 | 93,400 | 82,300 | — |
| Mw | 250,500 | 239,000 | 241,800 | 246,500 | 241,700 | 247,100 | — |
| Mp | — | 162,200 | 145,700 | 168,900 | 175,900 | 158,900 | — |
| Mw/Mn | 2.73 | 2.89 | 3.22 | 2.62 | 2.59 | 3.00 | — |
| Mole % unsaturated groups (IP), H$^1$ NMR | — | — | — | — | — | — | 4.14 |
| Mole % PMS in interpolymer, H$^1$ NMR | — | — | — | — | — | — | 4.64 |

†Catalyst solution was 1.0 wt % EADC and t-BuCl mixture in chloromethane, wherein the EADC/t-BuCl molar ratio was 3:1.

TABLE 4

Components of examples[1]

| Component (phr) | 1 | 2 | 3 (mol % Br) | 4 | 5 | 6 | 7 (mol % Br) |
|---|---|---|---|---|---|---|---|
| SBB 6222 | 100 | — | — | 100 | — | — | — |
| BIIR 2222 | — | — | — | — | 100 | — | — |
| IBMS (EXXPRO | — | 100 | — | — | — | 100 | — |

TABLE 4-continued

Components of examples[1]

| Component (phr) | 1 | 2 | 3 (mol % Br) | 4 | 5 | 6 | 7 (mol % Br) |
|---|---|---|---|---|---|---|---|
| 89-4) | | | | | | | |
| BrIBIMS | — | — | 100 (0.86) | — | — | — | 100 (1.1) |

[1]Each of samples 1–3 also include the following: 60 phr N666 carbon black; 4 phr SP-1068 resin; 7 phr STRUKTOL 40 MS; 1 phr stearic acid; 8 phr CALSOL 810 processing oil; 0.15 phr MAGLITE-K; 1 phr KADOX 911 zinc oxide; 0.5 phr sulfur; and 1.25 phr MBTS.

TABLE 5

Cure properties of examples

| property | 1 | 2 | 3 | 4 | 5 | 6 | 7 |
|---|---|---|---|---|---|---|---|
| MDR 160° C., 0.5° arc | | | | | | | |
| ML, dN·m | 1.12 | 1.86 | 0.51 | 1.22 | 1.33 | 1.53 | 0.48 |
| MH, dN·m | 5.47 | 7.6 | 4.84 | 5.12 | 6.06 | 8.09 | 3.51 |
| MH-ML, dN·m | 4.35 | 5.74 | 4.33 | 3.9 | 4.73 | 6.56 | 3.03 |
| Ts2, min | 8.83 | 10.42 | 5.87 | 5.52 | 4.8 | 6.06 | 2.08 |
| T50, min | 9.37 | 13.46 | 6.87 | 5.41 | 5.41 | 7.71 | 1.55 |
| T90, min | 16.66 | 24.96 | 22.91 | 10.28 | 12.16 | 13.53 | 10.11 |

TABLE 6

Physical properties of examples

| property | 1 | 2 | 3 | 4 | 5 | 6 | 7 |
|---|---|---|---|---|---|---|---|
| Mooney Viscosity, ML (1 + 4, 100° C.) | — | — | — | 51.70 | 53.70 | 62.50 | 33.20 |
| 20% Modulus, MPa | 0.58 | 0.65 | 0.58 | 0.57 | 0.53 | 0.68 | 0.64 |
| 100% Modulus, MPa | 1.32 | 1.92 | 1.26 | 1.17 | 1.13 | 1.87 | 1.14 |
| 300% Modulus, MPa | 4.40 | 5.85 | 3.81 | 3.65 | 3.68 | 5.72 | 3.01 |
| Tensile, MPa | 8.86 | 9.34 | 7.59 | 8.24 | 8.73 | 9.37 | 5.65 |
| Elongation at Break, % | 693 | 658 | 754 | 730 | 754 | 720 | 787 |
| Energy to Break, J | 9.43 | 10.64 | 9.56 | 10.53 | 12.00 | 13.18 | 8.73 |
| Shore A Hardness at 23° C. | 48.3 | 51.9 | 49.1 | 48.5 | 47.5 | 51.7 | 44.7 |
| MOCON oxygen permeability (65° C.) ($10^8$, cm³·cm/cm²·sec·atm) | 9.789 | 8.534 | 9.673 | 11.6 | 11.0 | 9.9 | 10.7 |
| Dispersion D scale | 5.6 | 6.9 | 6.3 | 5 | 6.2 | 7.2 | 6.6 |

TABLE 7

Aged properties of examples 4–7, and adhesion to SBR carcass

| property | 4 | 5 | 6 | 7 |
|---|---|---|---|---|
| Rebound, % | 10.2 | 10.2 | 9.9 | 8.8 |
| Aging, 72 hrs @ 125° C. | | | | |
| Aged 20% Modulus, MPa | 1.11 | 0.99 | 1.15 | 1.10 |
| Aged 100% Modulus, MPa | 2.46 | 2.53 | 3.50 | 2.75 |
| Aged 300% Modulus, MPa | 6.20 | 6.60 | 8.75 | 6.30 |
| Aged Tensile, MPa | 7.15 | 8.11 | 10.42 | 6.88 |
| Aged Elongation, % | 391 | 525 | 467 | 380 |
| Aged energy to break, J | 5.13 | 9.45 | 10.42 | 5.35 |
| Adhesion to SBR carcass @ 100° C., N/mm | 118.8 | 245.4 | 39.4 | 70.2 |
| DIN Abrasion resistance Index | 44 | 43 | 53 | 55 |
| Tear resistance, N/mm | 3.54 | 7.89 | 1.29 | 1.79 |

TABLE 8

Representative Tangent Delta values for the elastomers in FIG. 1, examples 4–7

| Tan Delta values at given temperatures, ° C. | SBB (4) | BIIR (5) | BIMS (6) | BrIBIMS (7) |
|---|---|---|---|---|
| −30 | 0.849 | 0.915 | 1.007 | 0.980 |
| 0 | 0.369 | 0.404 | 0.429 | 0.528 |
| 30 | 0.199 | 0.226 | 0.166 | 0.239 |
| 60 | 0.154 | 0.179 | 0.125 | 0.191 |

We claim:

1. A cured elastomeric composition comprising a halogenated terpolymer of $C_4$ to $C_8$ isoolefin derived units, $C_4$ to $C_{14}$ multiolefin derived units, and p-alkylstyrene derived units, wherein the composition is cured in the presence of a sulfur cure system; and wherein the adhesion to SBR value at 100° C. of the cured composition is greater than 70 N/mm.

2. The cured elastomeric composition of claim 1, also comprising a metal oxide, fatty acid, and an accelerator.

3. The cured elastomeric composition of claim 1, also comprising a filler selected from carbon black, modified carbon black, silica, alumina, calcium carbonate, clay, mica, talc, titanium dioxide, starch, wood flower, and mixtures thereof.

4. The cured elastomeric composition of claim 1, also comprising a secondary rubber selected from natural rubber, polybutadiene rubber, and mixtures thereof.

5. The cured elastomeric composition of claim 1, also comprising a secondary rubber selected from nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber; halogenated poly(isobutylene-co-p-methylstyrene) and mixtures thereof.

6. The cured elastomeric composition of claim 1, wherein the $C_4$ to $C_8$ isoolefin is isobutylene.

7. The cured elastomeric composition of claim 1, wherein the $C_4$ to $C_{14}$ multiolefin is selected from cyclopentadiene and isoprene.

8. The cured elastomeric composition of claim 1, wherein the p-alkylstyrene is p-methylstyrene.

9. The cured elastomeric composition of claim 1, wherein the terpolymer is brominated.

10. The cured elastomeric composition of claim 9, wherein the bromine is present in the terpolymer in the range of from 0.1 mole % to 2.5 mole % based on the total moles of monomer derived units in the terpolymer.

11. The cured elastomeric composition of claim 9, wherein the bromine is present in the terpolymer in the range of from 0.2 mole % to 2 mole % based on the total moles of monomer derived units in the terpolymer.

12. The cured elastomeric composition of claim 1, wherein the terpolymer has a number average molecular weight of from 300,000 to 800,000.

13. The cured elastomeric composition of claim 1, wherein the adhesion to SBR value at 100° C. is greater than 100 N/mm.

14. The cured elastomeric composition of claim 1, wherein the adhesion to SBR value at 100° C. is greater than 200 N/mm.

15. The cured elastomeric composition of claim 1, also comprising carbon black.

16. The cured elastomeric composition of claim 15, having a DIN Abrasion Index of greater than 45 units.

17. The cured elastomeric composition of claim 15, having a tangent delta value of greater than 0.60 at −30° C.

18. The cured elastomeric composition of claim 15, having a tangent delta value of greater than 0.20 at 0° C.

19. The cured elastomeric composition of claim 1, also comprising a filler present from 5 to 100 phr.

20. The elastomeric composition of claim 1, wherein the multiolefin derived units are present in the terpolymer from 0.2 wt % to 30 wt % and the p-alkylstyrene derived units are present from 0.5 wt % to 30 wt % by weight of the terpolymer.

21. An innerliner comprising the cured composition of claim 1.

22. An innertube comprising the cured composition of claim 1.

23. An elastomeric composition comprising a filler; a sulfur cure system; and a halogenated terpolymer of $C_4$ to $C_8$ isoolefin derived units, $C_4$ to $C_{14}$ multiolefin derived units, and p-alkylstyrene derived units.

24. The elastomeric composition of claim 23, also comprising a metal oxide, fatty acid, and an accelerator.

25. The elastomeric composition of claim 23, wherein the filler is selected from carbon black, modified carbon black, silica, alumina, calcium carbonate, clay, mica, talc, titanium dioxide, starch, wood flower, and mixtures thereof.

26. The elastomeric composition of claim 23, also comprising a secondary rubber selected from natural rubber, polybutadiene rubber, and mixtures thereof.

27. The elastomeric composition of claim 23, also comprising a secondary rubber selected from nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber; halogenated poly(isobutylene-co-p-methylstyrene) and mixtures thereof.

28. The elastomeric composition of claim 23, wherein the $C_4$ to $C_8$ isoolefin is isobutylene.

29. The elastomeric composition of claim 23, wherein the $C_4$ to $C_{14}$ multiolefin is selected from cyclopentadiene and isoprene.

30. The elastomeric composition of claim 23, wherein the p-alkylstyrene is p-methylstyrene.

31. The elastomeric composition of claim 23, wherein the terpolymer is brominated.

32. The elastomeric composition of claim 31, wherein the bromine is present in the terpolymer in the range of from 0.1 mole % to 2.5 mole % based on the total moles of monomer derived units in the terpolymer.

33. The elastomeric composition of claim 31, wherein the bromine is present in the terpolymer in the range of from 0.2 mole % to 2 mole % based on the total moles of monomer derived units in the terpolymer.

34. The elastomeric composition of claim 23, wherein the terpolymer has a number average molecular weight of from 300,000 to 800,000.

35. The elastomeric composition of claim 23, wherein the adhesion to SBR value at 100° C. of the cured composition is greater than 70 N/mm.

36. The elastomeric composition of claim 23, wherein the adhesion to SBR value at 100° C. of the cured composition is greater than 100 N/mm.

37. The elastomeric composition of claim 23, wherein the adhesion to SBR value at 100° C. of the cured composition is greater than 200 N/mm.

38. The elastomeric composition of claim 23, wherein the filler is carbon black.

39. The elastomeric composition of claim 23, wherein the cured composition has a DIN Abrasion Index of greater than 45 units.

40. The elastomeric composition of claim 23, wherein the cured composition has a tangent delta value of greater than 0.60 at −30° C.

41. The elastomeric composition of claim 23, wherein the cured composition has a tangent delta value of greater than 0.20 at 0° C.

42. The elastomeric composition of claim 23, wherein the filler is present from 5 to 100 phr.

43. The elastomeric composition of claim 23, wherein the multiolefin derived units are present in the terpolymer from 0.2 wt % to 30 wt % and the p-alkylstyrene derived units are present from 0.5 wt % to 30 wt % by weight of the terpolymer.

44. An innerliner comprising the composition of claim 23.

45. An innertube comprising the composition of claim 23.

46. An air barrier comprising the composition of claim 23.

47. An elastomeric composition comprising a sulfur cure system; a halogenated terpolymer of $C_4$ to $C_8$ isoolefin derived units, $C_4$ to $C_{14}$ multiolefin derived units, and p-alkylstyrene derived units; and a secondary rubber.

48. The elastomeric composition of claim 47, also comprising a metal oxide, fatty acid, and an accelerator.

49. The elastomeric composition of claim 47, also comprising a filler selected from modified carbon black, carbon black, silica, alumina, calcium carbonate, clay, mica, talc, titanium dioxide, starch, wood flower, and mixtures thereof.

50. The elastomeric composition of claim 47, wherein the filler is carbon black.

51. The elastomeric composition of claim 47, wherein the secondary rubber is selected from natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber; halogenated poly(isobutylene-co-p-methylstyrene) and mixtures thereof.

52. The elastomeric composition of claim 47, wherein the secondary rubber is present from 5 to 50 phr.

53. The elastomeric composition of claim 47, wherein the $C_4$ to $C_8$ isoolefin monomer is isobutylene.

54. The elastomeric composition of claim 47, wherein the $C_4$ to $C_{14}$ multiolefin monomer is isoprene.

55. The elastomeric composition of claim 47, wherein the p-alkylstyrene is p-methylstyrene.

56. The elastomeric composition of claim 47, wherein the terpolymer is brominated.

57. The elastomeric composition of claim 47, wherein the halogen is present in the terpolymer in the range of from 0.1 mole % to 2.5 mole % based on the total moles of monomer derived units in the terpolymer.

58. The elastomeric composition of claim 47, wherein the halogen is present in the terpolymer in the range of from 0.2 mole % to 2 mole % based on the total moles of monomer derived units in the terpolymer.

59. The elastomeric composition of claim 47, wherein the terpolymer has a number average molecular weight of from 80,000 to 1,000,000.

60. The elastomeric composition of claim 47, wherein the terpolymer has a number average molecular weight of from 300,000 to 800,000.

61. The elastomeric composition of claim 47, wherein the adhesion to SBR value at 100° C. is greater than 70 N/mm.

62. The elastomeric composition of claim 47, wherein the adhesion to SBR value at 100° C. is greater than 100 N/mm.

63. The elastomeric composition of claim 47, wherein the adhesion to SBR value at 100° C. is greater than 200 N/mm.

64. The elastomeric composition of claim 47, wherein the filler is carbon black and the terpolymer is brominated.

65. The elastomeric composition of claim 47, having a DIN Abrasion Index of greater than 90 units.

66. The elastomeric composition of claim 47, having a tangent delta value of from greater than 0.60 at −30° C.

67. The elastomeric composition of claim 47, having a tangent delta value of from greater than 0.25 at 0° C.

68. The elastomeric composition of claim 47, wherein the filler is present from 10 to 100 phr.

69. The elastomeric composition of claim 47, wherein the filler is present from 40 to 80 phr.

70. An innerliner comprising the composition of claim 47.

71. An air barrier comprising the composition of claim 47.

72. An innertube comprising the composition of claim 47.

73. An air barrier comprising a filler; a sulfur cure system; and a halogenated terpolymer of $C_4$ to $C_8$ isoolefin derived units, $C_4$ to $C_{14}$ multiolefin derived units, and p-alkylstyrene derived units; wherein the DIN Abrasion Index of the air barrier is greater than 50 units.

74. The air barrier of claim 73, also comprising a metal oxide, fatty acid, and an accelerator.

75. The air barrier of claim 73, wherein the filler is selected from carbon black, modified carbon black, silica, alumina, calcium carbonate, clay, mica, talc, titanium dioxide, starch, wood flower, and mixtures thereof.

76. The air barrier of claim 73, also comprising a secondary rubber selected from natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber; halogenated poly(isobutylene-co-p-methylstyrene) and mixtures thereof.

77. The air barrier of claim 73, wherein the $C_4$ to $C_8$ isoolefin monomer is isobutylene.

78. The air barrier of claim 73, wherein the $C_4$ to $C_{14}$ multiolefin monomer is selected from cyclopentadiene and isoprene.

79. The air barrier of claim 73, wherein the p-alkylstyrene is p-methylstyrene.

80. The air barrier of claim 73, wherein the terpolymer is brominated.

81. The air barrier of claim 80, wherein the bromine is present in the terpolymer in the range of from 0.1 mole % to 2.5 mole % based on the total moles of monomer derived units in the terpolymer.

82. The air barrier of claim 80, wherein the bromine is present in the terpolymer in the range of from 0.2 mole % to 2 mole % based on the total moles of monomer derived units in the terpolymer.

83. The air barrier of claim 73, wherein the terpolymer has a number average molecular weight of from 80,000 to 1,000,000.

84. The air barrier of claim 73, wherein the terpolymer has a number average molecular weight of from 300,000 to 800,000.

85. The air barrier of claim 73, wherein the adhesion to SBR value at 100° C. is greater than 100 N/mm.

86. The air barrier of claim 73, wherein the adhesion to SBR value at 100° C. is greater than 200 N/mm.

87. The air barrier of claim 73, wherein the filler is carbon black.

88. The air barrier of claim 73, having a DIN Abrasion Index of greater than 50 units.

89. The air barrier of claim 73, having a tangent delta value of from greater than 0.60 at −30° C.

90. The air barrier of claim 73, having a tangent delta value of from greater than 0.20 at 0° C.

91. The air barrier of claim 73, wherein the filler is present from 5 to 100 phr.

92. The air barrier of claim 73, wherein the multiolefin derived units are present in the terpolymer from 0.2 wt % to 30 wt % and the p-alkylstyrene derived units are present from 0.5 wt % to 30 wt % by weight of the terpolymer.

93. An innerliner for an automotive tire comprising the air barrier of claim 73.

94. An innertube comprising the air barrier of claim 73.

* * * * *